United States Patent [19]

Spivy

[11] Patent Number: 4,754,543
[45] Date of Patent: Jul. 5, 1988

[54] METHOD OF MAKING EXPANDABLE AND COLLAPSIBLE MANDREL

[75] Inventor: Paul L. Spivy, Springfield, Mo.

[73] Assignee: Dayco Products, Inc., Dayton, Ohio

[21] Appl. No.: 94,942

[22] Filed: Sep. 10, 1987

Related U.S. Application Data

[63] Continuation of Ser. No. 880,218, Jun. 30, 1986, abandoned, which is a continuation of Ser. No. 267,835, May 28, 1981, abandoned, which is a continuation of Ser. No. 139,622, Apr. 14, 1980, abandoned, which is a continuation of Ser. No. 970,712, Dec. 18, 1978, abandoned.

[51] Int. Cl.⁴ .................. B23P 13/02; B23B 31/40
[52] U.S. Cl. .................. 29/557; 279/1 R; 279/2 R
[58] Field of Search ............ 29/557, 558, 159.3, 29/559, 33 D, 33.7; 279/2 R, 2 A, 1 R, 1 ME; 242/68.2, 72; 76/101 R

[56] References Cited

U.S. PATENT DOCUMENTS

| 718,700 | 1/1903 | Crosby et al. | 279/2 R |
|---|---|---|---|
| 1,919,340 | 7/1933 | Lyford | 279/2 R |
| 2,211,471 | 8/1940 | Klein | 279/2 R |
| 2,264,589 | 12/1941 | Ryoquist | 279/2 R |
| 2,321,146 | 6/1943 | Jones | 279/2 R |
| 2,682,924 | 7/1954 | Lomazzo et al. | 279/2 R |
| 2,690,914 | 10/1954 | Bryant et al. | 279/2 R |
| 2,753,388 | 7/1956 | Buerkas | 279/2 R |

FOREIGN PATENT DOCUMENTS 239579  2/1946  Switzerland .................. 279/2

Primary Examiner—William R. Briggs
Attorney, Agent, or Firm—Joseph V. Tassone

[57] ABSTRACT

An expandible and collapsible mandrel and method of making same are provided wherein such mandrel has a central support and a plurality of longitudinal segments supported for pivoting movements toward and away from the support and the longitudinal segments have circumferentially disposed intermeshing fingers which cooperate to provide a substantially cylindrical supporting outside surface at each of an infinite number of effective diameters and with the supporting surface at each effective diameter being free of longitudinal gaps which extend the full length of the longitudinal segments.

7 Claims, 3 Drawing Sheets

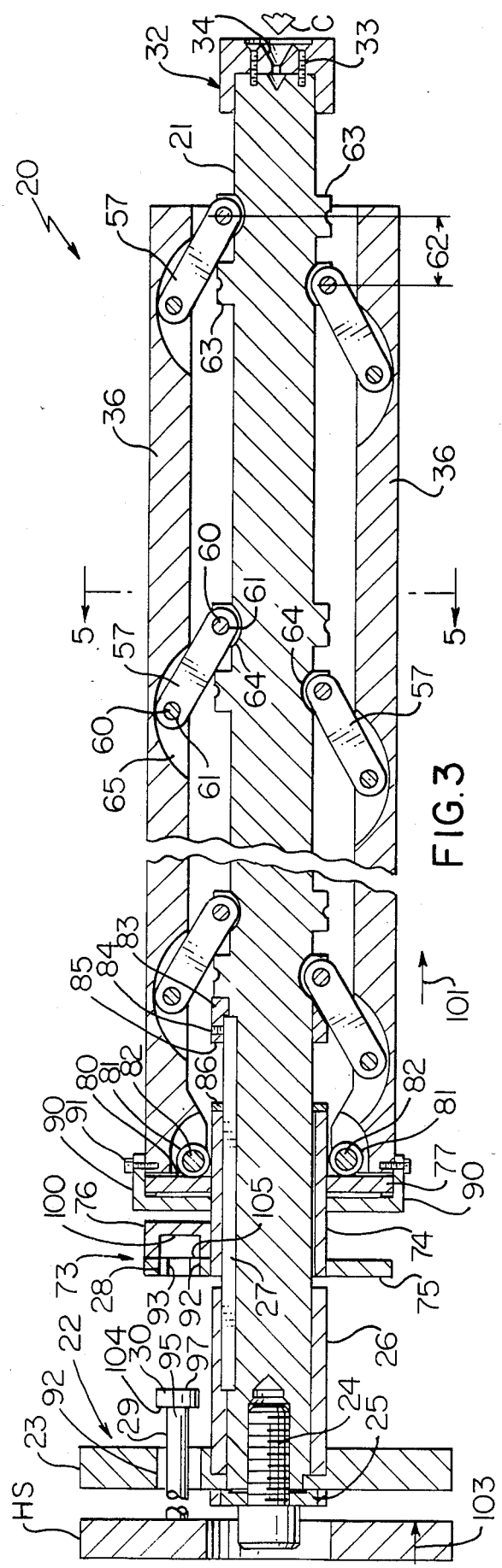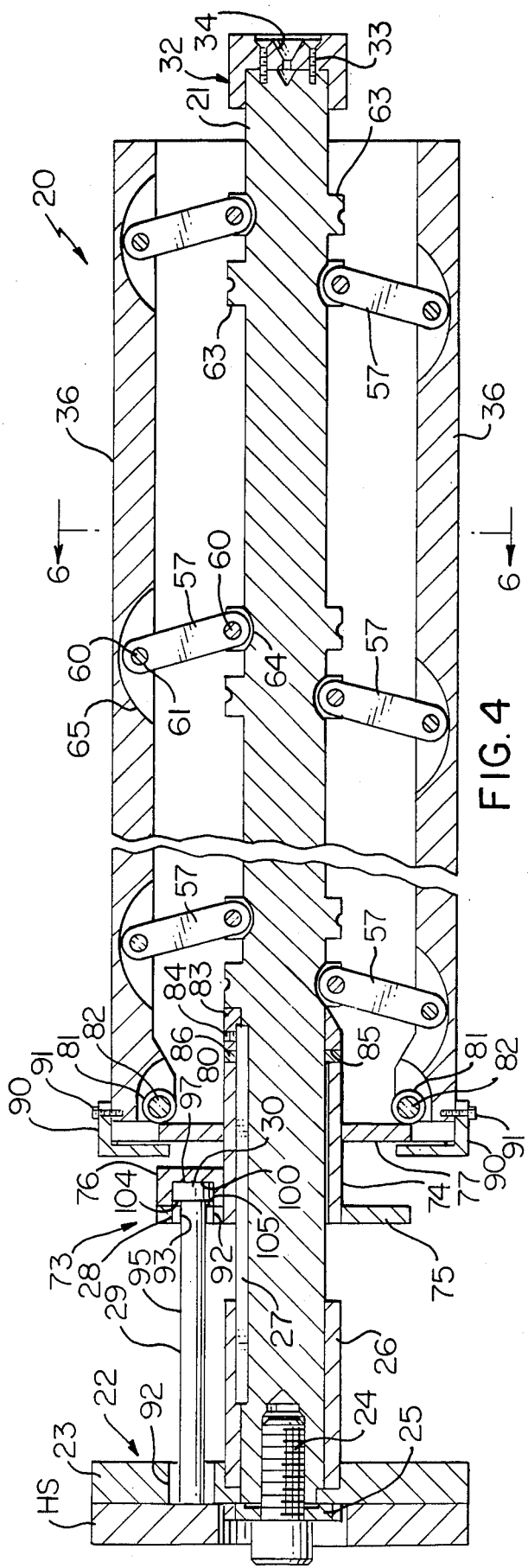

METHOD OF MAKING EXPANDABLE AND COLLAPSIBLE MANDREL

CROSS REFERENCE TO RELATED APPLICATION

This application is a continuation patent application of its copending parent patent application, Ser. No. 880,218, filed June 30, 1986, now abandoned, which, in turn, is a continuation application of its copending parent patent application, Ser. No. 267,835, filed May 28, 1981, now abandoned, which, in turn, is a continuation patent application of its copending parent patent application, Ser. No. 139,622, filed Apr. 14, 1980, now abandoned, which, in turn, is a continuation patent application of its copending parent patent application, Ser. No. 970,712, filed Dec. 18, 1978, now abandoned.

BACKGROUND OF THE INVENTION

1. Field of the Invention

This invention relates to an expandible and collapsible mandrel and method of making same wherein such mandrel is adapted for use in the manufacture of endless power transmission belts including the cutting of such belts from a tubular sleeve employed to make same.

2. Prior Art Statement

It is known in the art to provide an expandible and collapsible mandrel, and method of making same, wherein said mandrel has a central support and a plurality of longitudinal segments supported for pivoting movements toward and away from the support and an example of such a mandrel is shown in U.S. Pat. No. 2,682,924. However, the mandrel disclosed in this patent is expandible from a minimum effective diameter to a maximum effective diameter and at each diameter other than such minimum diameter the associated support surface is not substantially cylindrical and longitudinal gaps exist between adjacent segments which extend the full axial length of the mandrel, whereby with such a mandrel adequate support for a tubular sleeve-like workpiece is only provided at the minimum effective diameter.

SUMMARY

It is a feature of this invention to provide an expandible and collapsible mandrel which provides a substantially cylindrical support for a tubular workpiece supported thereon at each and every position thereof from a minimum effective diameter to a maximum effective diameter.

Another feature of this invention is to provide a mandrel of the character mentioned which provides a supporting surface at each of an infinite number of effective diameters free of longitudinal gaps which extend the full length of longitudinal segments defining the supporting surface.

Another feature of this invention is to provide a mandrel of the character mentioned wherein longitudinal segments comprising same have circumferentially disposed intermeshing fingers which cooperate to provide a substantially cylindrical supporting outside surface at each of an infinite number of effective diameters with the supporting surface at each effective diameter being free of longitudinal gaps which extend the full length of the longitudinal segments.

Another feature of this invention is to provide a mandrel of the character mentioned having central support means and a plurality of pivotable links connected between each segment thereof and the support means to move the segments and support same at each effective diameter.

Another feature of this invention is to provide a mandrel of the character mentioned having central support means provided with inclined cam surfaces and with each segment having cooperating inclined supporting surfaces, with the segments being axially movable relative to the support means causing the inclined supporting surfaces to be cammed by the cam surfaces to move each segment and support same at each effective diameter.

Another feature of this invention is to provide a mandrel of the character mentioned wherein the intermeshing fingers are of rectangular peripheral outline when viewed substantially perpendicular to the central longitudinal axis of the mandrel and mesh with corresponding slots also of substantially rectangular outline and provided in immediately adjacent segments.

Another feature of this invention is to provide a mandrel of the character mentioned which has simple means for moving the longitudinal segments with their interlocking fingers to provide expansion and collapsing of the mandrel.

Another feature of this invention is to provide a mandrel of the character mentioned particularly adapted to support a tubular workpiece in the form of a sleeve of extended axial length which is to be cut to define a plurality of endless power transmission belts.

Another feature of this invention is to provide an improved method of making a mandrel of the character mentioned.

Therefore, it is an object of this invention to provide an expandible and collapsible mandrel and method of making same having one or more of the novel features set forth above or hereinafter shown or described.

Other details, features, uses, objects, and advantages of this invention will become apparent from the exemplary embodiments thereof presented in the following specification, claims, and drawings.

BRIEF DESCRIPTION OF THE DRAWINGS

The accompanying drawings show present preferred embodiments of this invention, in which

FIG. 3 is a cross-sectional view taken essentially on the line 3—3 of FIG. 1;

FIG. 4 is a cross-sectional view taken essentially on the line 4—4 of FIG. 2;

DESCRIPTION OF ILLUSTRATED EMBODIMENTS

Figure 1:
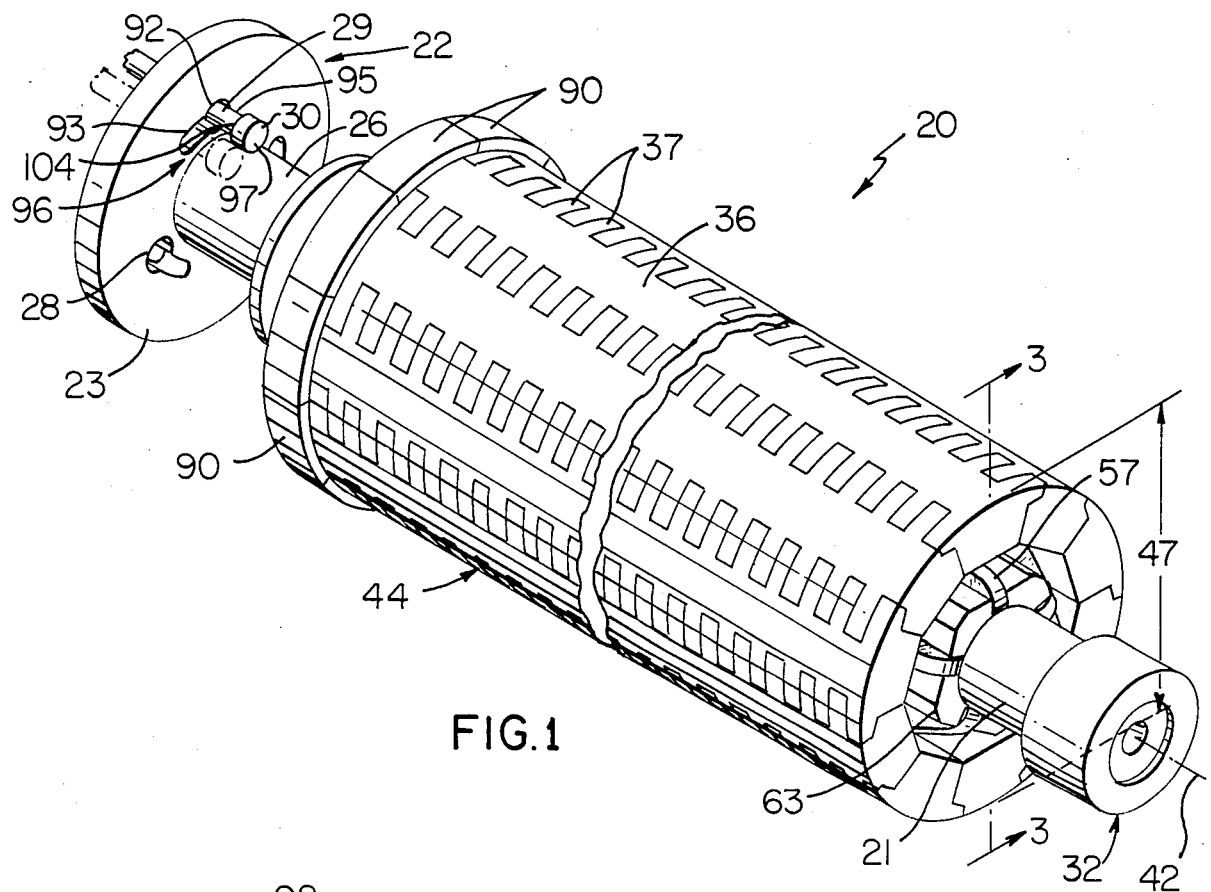
FIG. 1 is a perspective view with a central portion broken away of one exemplary embodiment of an expandible and collapsible mandrel of this invention and showing such mandrel collapsed to the minimum effective diameter thereof.
Figure 2:
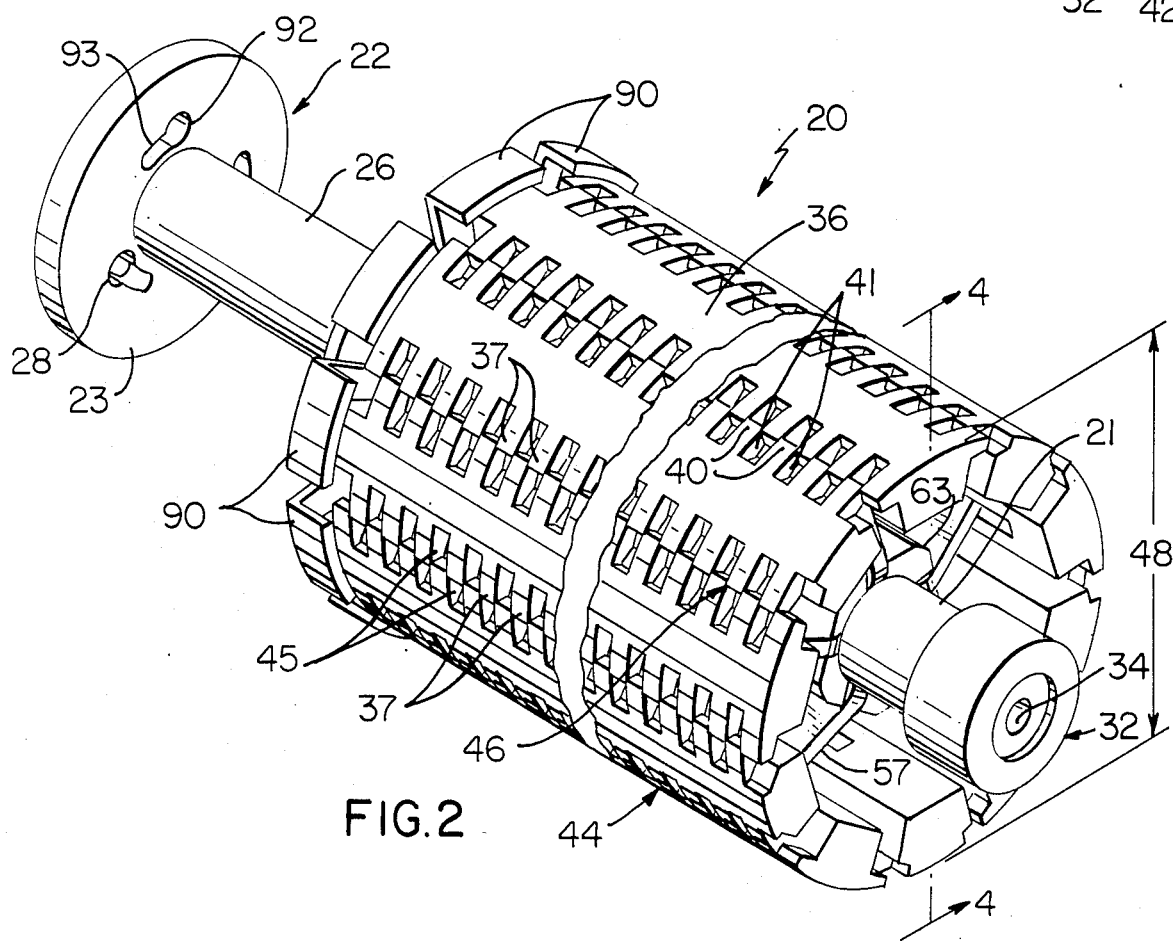
FIG. 2 is a view similar to FIG. 1 showing the mandrel expanded to the maximum effective diameter thereof.

Reference is now made to FIGS. 1 and 2 of the drawings which illustrate one exemplary embodiment of an expandible and collapsible mandrel of this invention which is designated generally by the reference numeral 20. The mandrel 20 is particularly adapted to be used to support a tubular or cylindrical workpiece in the form of a beltdefining sleeve which is made in accordance with techniques known in the art and is then disposed on the mandrel 20 for cutting thereof to provide a plurality of endless power transmission belts from such sleeve, and each cut belt has precise dimensional characteristics due to the improved support which is provided by the mandrel 20 of this invention.

As best seen in FIGS. 3 and 4 of the drawings, the mandrel 20 has a central support means shown as a central support shaft which is designated generally by the reference numeral 21. The support shaft 21 has a support structure 22 at one end thereof including an annular outer support flange 23 for the mandrel which is detachably fixed to one end of the shaft 21 with a threaded metal screw 24 and a washer 25. The mandrel 20 also has a sleeve 26 fixed at its outer end to the flange 23 and the sleeve 26 is keyed to the shaft 21 by a key 27 whereby upon rotating the flange 23, as will be described subsequently, the shaft 21 and the entire mandrel 20 are simultaneously rotated.

The flange 23 has a plurality of three elongated openings therein each designated by the same reference numeral 28 (FIGS. 1 and 2) and the openings 28 are particularly adapted to receive a corresponding plurality of three rotating or driving members 29 therethrough with a typical one of the three driving members 29 employed in this example being shown in FIGS. 3 and 4 of the drawings. The driving members 29 are used to support the mandrel 20 at one end as well as rotate the flange 23 and hence the entire mandrel 20; and the driving members 29 are in the form of bolt-like members and have head portions 30 which are adapted to be extended through the openings 29 so that the main shaft portions of the driving members may engage surface portions of the flange 23 defining the openings 28 for the purpose of supporting and rotating the overall mandrel. The driving members 29 comprise components of a rotatable headstock of a commercially available machine tool and such headstock is illustrated in FIGS. 3 and 4 of the drawings and designated by the reference letters HS.

The central support means or support shaft 21 also has a support assembly which is designated generally by the reference numeral 32 suitably fixed to the opposite end thereof by a plurality of threaded metal bolts 33; and, the support assembly 32 has a substantially frustoconical supporting surface 34 which is particularly adapted to receive a correspondingly shaped support center C of the tailstock (not shown) of the previously mentioned machine tool. In normal operation the mandrel 20 has its flange 23 supported and driven by members 29 of the machine tool headstock HS while the support assembly 32 has its supporting surface 34 rotatably supported by the support center C of the tailstock to thereby support the mandrel 20 therebetween in the usual manner for cutting of a belt sleeve, or the like.

The belt-defining sleeve which is to be supported by the mandrel 20 is formed, cured, and cooled as is known in the art prior to installation thereof on the mandrel 20. Further, a build-up or back-up sleeve may also be used and disposed directly on the mandrel with the beltdefining sleeve therearound.

The overall machine which has the headstock HS with its members 29, tailstock with its support center C, and belt cutting apparatus are well known in the art and do not form a part of this invention whereby such machine and its above-mentioned components have not been described in detail. Also, headstock HS is basically shown schematically.

The mandrel 20 has a plurality of cooperating longitudinal segments which for simplicity and ease of presentation are each designated by the same reference numeral 36 and such segments are supported for movement toward and away from the support 21. The number of segments 36 employed in a particular mandrel 20 will vary; however, regardless of number, the segments 36 are constructed and arranged such that they provide a substantially cylindrical supporting outside surface at each of an infinite number of effective diameters as will now be described in detail.

The cooperating longitudinal segments 36 have circumferentially disposed intermeshing fingers each designated by the same reference numeral 37. The fingers 37 of each segment in this example of the invention are defined by alternating substantially rectangular projections 40 and cooperating substantially rectangular cutouts or recesses 41, whereby the fingers 37 have what may be considered a substantially rectangular peripheral outline when viewed perpendicularly toward a central longitudinal axis 42 through the mandrel 20.

As will be apparent from FIGS. 1 and 2 of the drawings, and as mentioned previously, the fingers 37 are circumferentially disposed, i.e., such fingers extend in a substantially circumferential path regardless of the expanded or collapsed condition of the mandrel 20. Further, as mentioned earlier, the intermeshing fingers 37 cooperate to provide a substantially cylindrical supporting surface 44 at each of an infinite number of effective diameters with the supporting surface 44 at each effective diameter being free of longitudinal gaps which extend the full length of the longitudinal segments 36.

For example, FIG. 1 illustrates the mandrel 20 at its minimum effective diameter and the supporting surface 44 at such minimum diameter is substantially cylindrical and actually free of any gaps along such surface whether longitudinal or circumferential. Similarly, the supporting surface 44 at the maximum effective diameter of the mandrel 20 is also free of longitudinal gaps which extend the full length of the longitudinal segments, although rectangular openings shown typically at 45 are provided as each particular finger 37 is moved away from the cutout 41 within which it is nested with the mandrel in its collapsed condition. It will be noted, as illustrated in FIG. 2, typically at 46 that the terminal ends of immediately adjacent fingers of each pair of adjoining segments 36 slightly overlap or substantially coincide with a rectilinear line on surface 44 which is disposed parallel to axis 42 to thereby assure surface 44 is free of any longitudinal gaps which extend the full axial length of the segments 36. The provision of supporting surface 44 which is free of longitudinal gaps which extend the full length of the longitudinal segments assures that a belt-defining sleeve supported by mandrel 20 may be machined or cut with precision.

The segments 36 are supported for movements toward and away from the central support shaft as will now be described and as explained earlier the intermeshing fingers provide a substantially cylindrical supporting surface at each of an infinite number of effective diameters ranging from the minimum diameter shown at 47 in FIG. 1 to the maximum diameter 48 shown in FIG. 2. This reference to effective diameter is used because a true and exact diameter and hence perfectly circular cross section is only provided at one theoretical position of the segments relative to the central axis 42 as will be explained subsequently. Accordingly, due to the technique used to make the mandrel with its supporting surface 44, such surface (FIG. 1) while being substantially cylindrical is not perfectly right circular cylindrical and as will be readily apparent by typical portions 51 of certain segments 36 projecting outwardly of a perfect right circular cylindrical supporting surface shown at 52 at the minimum effective diameter illustrated in FIG. 5. Similarly, at the maximum effective diameter as illustrated in FIG. 6, the supporting surface 44 is still substantially cylindrical; however, when viewing a particular cross section of the mandrel perpendicular to longitudinal axis 42 there are slight undulations with recesses 53 and such recesses 53 are disposed radially inwardly of a theoretical right circular cylindrical outside surface shown at 54.

Figure 7:
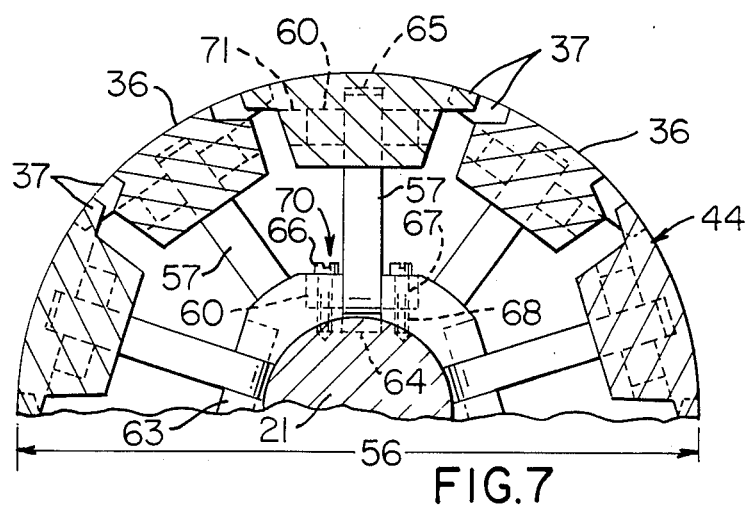
FIG. 7 is a view similar to FIG. 6 showing the mandrel partially expanded to an effective diameter which is defined on a perfect circle.

Thus, it is seen that the supporting surface 44 at the minimum diameter has projections 51 and at the maximum diameter has the recesses 53. However, at a location between the minimum effective diameter 47 and the maximum effective diameter 48 a true and exact diameter 56 is provided as shown in FIG. 7. The exact diameter 56 in this example is provided roughly midway between the minimum and maximum effective diameters and assures that the supporting surface 44 is close to being right circular cylindrical throughout the entire range of the mandrel 20. The method used to assure a perfect diameter 56 and a right circular cylindrical surface roughly midway along the expansion range of the mandrel 20 will be described subsequently.

As previously mentioned, the mandrel 20 has its segments 36 supported for movement toward and away from the central support shaft 21 and in this example of the invention, the segments 36 are supported for pivoting movements employing a plurality of links each designated by the same reference numeral 57. Each link 57 is a rectilinear link and is supported for pivoting movement by a pair of inner and outer transverse pins 60 extending through associated openings 61 in opposite ends of each link 57 with this reference to inner and outer pins referring to proximity relative to the central axis 42 of the mandrel 20.

Figure 5:
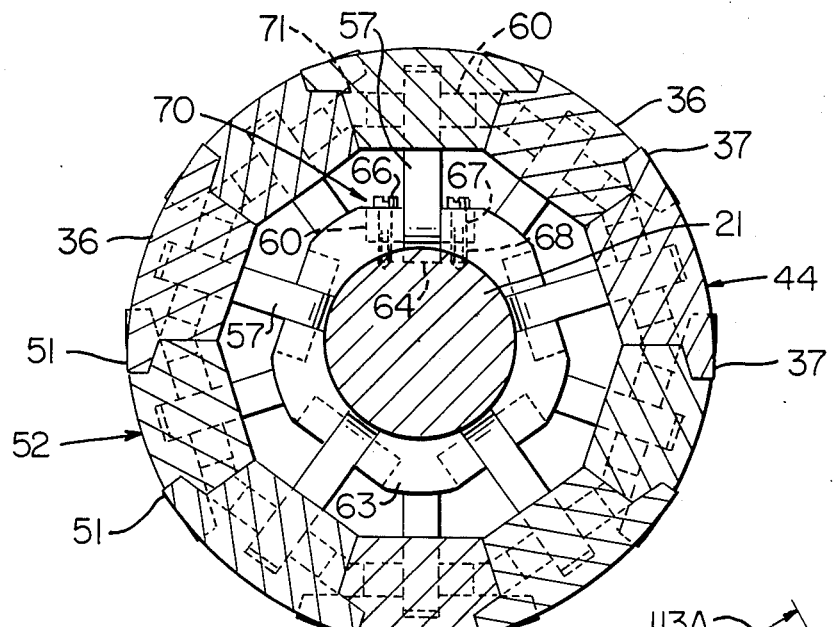
FIG. 5 is a cross-sectional view of the collapsed mandrel taken essentially on the line 5—5 of FIG. 4.
Figure 6:
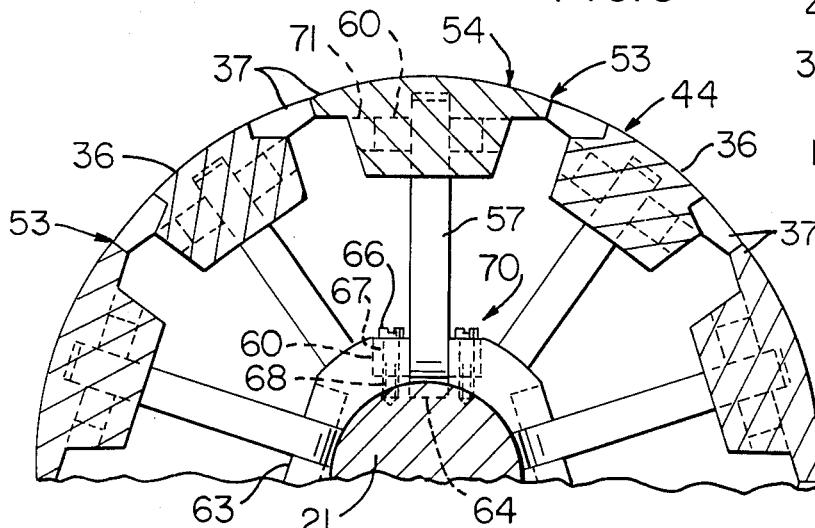
FIG. 6 is a fragmentary cross-sectional view of the upper half portion of the expanded mandrel taken essentially on the line 6—6 of FIG. 4.

As seen in FIGS. 3 and 5 of the drawings, for example, the links 57 and pins 60 of a particular segment 36 are disposed at one set of axial positions along the central support shaft 21 while the links 57 and pins 60 of an immediately adjoining segment are disposed at another set of axial positions along the shaft 21. This relationship may be readily understood by viewing the diametrically opposed segments 36 in FIG. 3 wherein associated pins 60 thereof near one end of the mandrel 20 are axially spaced apart a typical distance 62, for example. This type of arrangement allows the employment of a maximum number of longitudinal segments 36 which are to be supported for pivoting movements by associated links 57 and with minimum likelihood of interference by the links of adjoining segments 36.

Each link 57 is pivotally supported employing an associated suitable annular projection or flange 63 on the central shaft 21 and appropriate cutouts 64 are provided in the shaft 21 to allow pivoting movements of the inner end portions of associated links 57. Similarly, cutouts 65 are provided in the segments 36 to allow pivoting movements of the outer end portions of associated links 57.

Each inner pin 60 may be fastened in position to the central support shaft 21 employing any technique known in the art; however, in this example after disposing each inner pin 60 through its opening 61 in link 57 a pair of threaded metal fastening screws 66 are extended through openings 67 in opposite ends of each inner pin 60 and threaded within associated threaded openings 68 in an associated annular flange 63 of the central support 21. For ease of presentation only one link 57 is shown with its inner pin 60 fastened in position as shown at 70 in each of FIGS. 5–7.

Each outer pin 60 is used to fasten its link 57 to an associated segment 36; and, although metal screws similar to screws 66 may be used for this purpose in this example each outer pin is disposed through its opening 61 in the outer part of an associated link 57 and through a pair of associated aligned openings 71 in an associated segment 36. The diameter of each pair of openings 71 may be such that the associated pin 60 may be press fit and held in position while the outer opening 61 in link 57 is such as to allow free pivoting movement of the associated end portion of the link.

The mandrel 20 also has integral segment moving means for providing expansion and collapsing thereof and such moving means is designated generally by the reference numeral 73, FIGS. 3–4. The moving means 73 comprises a tubular shaft 74 which is axially slidable along an associated end portion of the central shaft 21 and tubular shaft 74 is keyed to the central shaft 21 by the previously described key 27. An annular member 75 is suitably fixed to the outer end of the tubular shaft 74 and a bearing plate 76 is fixed against the inside surface of the member 75, and the functions of the member 75 and plate 76 will be described subsequently.

The moving means 73 of the mandrel 20 also comprises a segment actuating disc 77 which is suitably fixed to the tubular shaft 74 and the disc 77 has an inside surface 80 which is particularly adapted to engage rollers provided on the segments 36 with each roller being designated by the reference numeral 81 and being rotatably supported on an associated segment 36 by an associated roller shaft 82 which is detachably mounted on such segment.

The mandrel 20 also has a stop member in the form of a tubular stop 83 which is suitably fixed by threaded set screws 84 to the central shaft 21 on the end portion thereof which has the flange 23 fixed thereto. The stop 83 has an annular stop surface 85 which is particularly adapted to be engaged by a stop ring 86 which is made of a wear-resistant material and suitably fixed to terminal inner end of the tubular shaft 74.

Each segment 36 of the mandrel 20 also has a substantially L-shaped cap member 90 attached to its terminal outer end by at least one threaded metal screw 91. Each cap member 91 serves to protect the end of its associated segment 36 and the segment-actuating roller 81 associated therewith.

As will be apparent from FIG. 1 of the drawings, for example, each elongate opening 28 has an enlarged area portion 92 of substantially circular outline which is adjoined by an elongate portion 93. Each large area portion 92 is particularly adapted to receive a head 30 of an associated driving member 29 therethrough and the head 30 is such that one through portion 92, the headstock HS is operated to rotate the driving members 29 so that the main portion 95 of each driving member is moved to the dotted line position illustrated at 96 in FIG. 1 for only one of such driving member 29, for example. In this position illustrated at 96 the driving members 29 support their end of the mandrel 20 and rotate the flange 23, central shaft 21, and hence mandrel 20.

The driving members 29 are also used to expand the mandrel and to provide such expansion the members 29 are extended through openings 28 in the flange 23 and through openings in the annular member 75, and because such openings in member 75 are identical to the openings 28 in the flange 23 they also will be designated by the reference numeral 28. The openings 28 in member 75 also have enlarged opening portions 92 and elongate portions 93 in a similar manner as in flange 23 and are axially aligned with the openings 28 in member 23. To expand the mandrel 20, the driving members 29 are extended through the openings 28 in the flange 23 and in the member 75 so that the terminal end 97 of the head 30 of each driving member 29 engages surface 100 of the bearing plate 76. Upon engaging surface 100 the members are moved by the headstock HS such that the tubular shaft 74 and disc 77 are moved to the right as viewed in FIG. 3 and as indicated by the arrow 101 in FIG. 3. This movement causes the cam rollers 81 to ride radially outwardly along the inside surface 80 of the disc 77 and thereby radially expand the mandrel 20 whereby the cam rollers 81 are moved to the positions on the surface 80 as illustrated in FIG. 4.

The moving force which makes possible this expansion of mandrel 20 is provided by suitable actuating means in the headstock HS and is designated schematically by an arrow 103. The mandrel 20 is maintained in such expanded position by continued application of force by the actuator 103. Further, with the actuator 103 actuated as shown in FIG. 4 the mandrel 20 is rotated by the headstock HS rotating the driving members 29 so that they are in their driving or rotating positions shown typically by the dotted line position 96 illustrated in FIG. 1 and previously described. With rotation of the mandrel 20 suitable cutting means associated with the mandrel is provided to grind the outside surface of and then cut the tubular belt-defining sleeve disposed on mandrel 20 to provide a plurality of endless power transmission belts from such sleeve and as is known in the art.

The moving means 73 is also used to collapse the mandrel 20. For example, once it is desired to collapse the mandrel 20 after completion of the cutting of the tubular sleeve disposed thereon the acutator 103 of the headstock HS is energized to retract the headstock HS on its slide or machine way. It will be noted that this simple retraction causes the inside surfaces 104 of the heads 30 of members 29 to engage the surface 105 of the annular member 75 and with continued retracting movement of the headstock HS and members 29 to the left, as viewed in FIGS. 3-4, the tubular shaft 74 is moved to the position illustrated in FIG. 3 thereby returning the segments 36 and mandrel to the position illustrated, which is the collapsed condition of mandrel 20. Once the mandrel is in its collapsed condition the headstock HS is rotated the few degrees necessary to return the driving members 29 so that their heads are aligned with enlarged portions 92 of the openings 28 whereupon after suitably supporting the empty mandrel 20 the driving members 29 may be retracted through the openings 28 in the annular member 75 and the identical openings 28 in the flange 23 to enable removal of the mandrel 20 from the machine tool associated with the headstock HS to enable placement of another belt-defining sleeve thereon.

Thus, it is seen that the segment moving means 73 is of optimum simplicity and provides the necessary expansion and collapsing of the mandrel 20. Further, while the above description has been made in connection with expansion and collapsing of the mandrel 20 from its minimum effective diameter to its maximum effective diameter as shown in FIGS. 3 and 4 respectively the mandrel components described above and the actuator 103 may be used to expand and hold the mandrel at any intermediate position between the two extremes illustrated in FIGS. 3 and 4 to accomodate a tubular belt-defining sleeve which is to be cut and which is of a size between the two effective diameters illustrated.

The mandrel 20 may be made using any suitable technique known in the art; however, such mandrel is made in this example of the invention by defining the central shaft 21 with its integral annular flanges 63 and cutouts 64 and 65 therein. The links 57 are made and provided with openings 61 at their opposite ends; and, the segments 36 are formed by any suitable process and in this example such segments are made by machining suitable metal workpieces. However, the primary effort is expended to provide the required projections 40 and cutouts 41 which define the intermeshing fingers 37 and this is achieved without particular concern for the final configuration of the supporting surface 44.

The links 57 are then installed on their segments 36 employing associated pins 60 whereupon each segment 36 is then pivotally mounted to the central shaft 21 using inner pins 60 to mount the inner ends of the links 57 to such shaft. The segments 36 are mounted to shaft 21 starting with a first segment 36 and then serially mounting the remaining segments with all segments 36 in their expanded positions. The final segment is mounted using the openings between fingers 37 in their fully expanded position to fasten the final screws 66 in position.

After all segments 36 are mounted in position the mandrel 20 is expanded by moving the segments 36 thereof to a predetermined forming or machining position between the minimum effective diameter of the completed mandrel 20 with the fingers intermeshed and the maximum effective diameter 48 with such fingers intermeshed whereupon the segments are suitably fixed employing any suitable apparatus or device so as to prevent any movement thereof relative to shaft 21. This machining position represents the position illustrated in FIG. 7 and at this location the outside supporting surface 44 is precisely defined by grinding, cutting, or otherwise forming thereof to define the supporting surface 44 as a precise right circular cylindrical surface. The supporting surface 44 at other than the machining position of FIG. 7 is substantially cylindrical as explained earlier but is not perfectly right circular cylindrical.

In this example the machining position which defines the surface 44 of FIG. 7 is midway between the minimum effective diameter of FIG. 1 and the maximum effective diameter of FIG. 2. However, such machining position may vary depending on the linkage between shaft 21 and segments 36. In one example such machining position was one third of the way from the minimum effective diameter.

Figure 9:
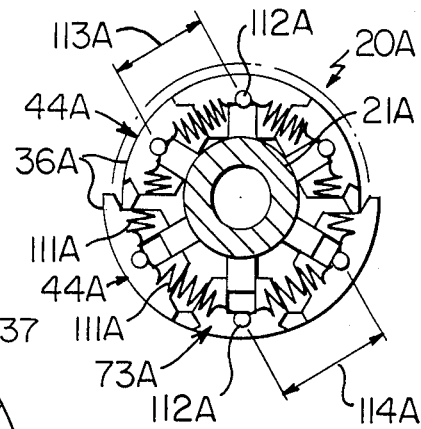
FIG. 9 is a view taken essentially on line 9—9 of FIG. 8.
Figure 8:
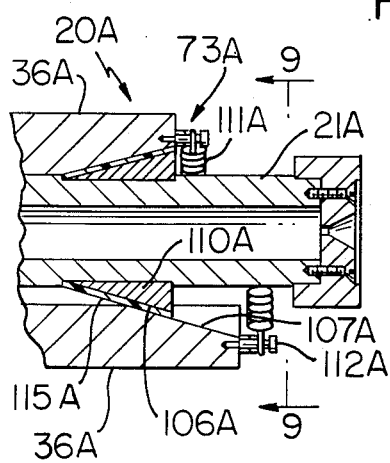
FIG. 8 is a fragmentary cross-sectional view of an end portion of another exemplary embodiment of the mandrel of this invention with the upper portion showing the mandrel in its collapsed condition and the lower portion showing the mandrel in its expanded condition.

Another exemplary embodiment of the mandrel of this invention is illustrated in FIGS. 8 and 9 of the drawings. The mandrel illustrated in FIGS. 8 and 9 is similar to the mandrel 20; therefore, such mandrel will be designated by the reference numeral 20A and representative parts of such mandrel which are similar to corresponding parts of the mandrel 20 will be designated in the drawings by the same reference numerals as in the mandrel 20 (whether or not such representative parts are mentioned in the specification) followed by the letter designation A and not described again in detail. Only those component parts of the mandrel 20A which are substantially different from corresponding parts of the mandrel 20 will be designated by a new reference numeral also followed by the letter designation A and described in detail.

The mandrel 20A basically operates in a similar manner as the mandrel 20; however, the main difference in the mandrel 20A is the simplicity of the moving means 73A thereof for providing expansion and collapsing of its segments 36A. In particular, the central support means or shaft 21A has inclined cam surfaces 106A and each segment 36A is provided with cooperating inclined supporting surfaces 107A. The segments 36A are axially movable relative to the central support shaft 21A whereupon the inclined supporting surfaces 107A are cammed by the cam surfaces 106A to thereby support each segment 36A at each of an infinite number of effective diameters which may range between the minimum diameter and radius shown in the top portions of FIGS. 8–9 to the maximum diameter and radius shown in bottom portions of these same FIGS.

In the manufacture of the mandrel 20A it will be appreciated that adjoining segments 36A are supported on inclined cam surfaces 106A which are displaced axially along the shaft 21A in a similar manner as the displacement 62 of pins 60 in mandrel 20 and for the same reasons as discussed previously.

The cam surfaces 106A may be provided on the central support shaft 21A utilizing any suitable technique known in the art and such surfaces may be provided by forming or otherwise machining the surfaces directly on the member 21A whereby shaft 21A with the cam surfaces 106A thereon may be part of a single-piece structure. However, preferably the cam surfaces 106A are defined by providing a plurality of corresponding wedges 110A of the desired configuration and the wedges 110A may be suitably fixed in position employing any suitable technique such as welding, fastening screws, or the like, and in this example, the wedges 110A are fixed in position by welding.

The cam surfaces 106A and the cooperating inclined supporting surfaces 107A are preferably defined as cooperating planar or flat surfaces; however, it will be appreciated that surfaces 106A and 107A may be made as cooperating arcuate surfaces, if desired.

To assure that the relative movement between the segments 36A and the central support shaft 21A is provided in an efficient manner, suitable antifriction means may be provided between each set of cooperating surfaces 106A and 107A and such antifriction means may be in the form of a film or coating of a suitable antifriction material 115A. The antifriction material 115A may be defined by a material such as polyethelene, or the like.

The segments 36A are prevented from moving radially inwardly by the cam surfaces 106A. However, to prevent excess outward expansion of the segments 36A, a plurality of tension springs are employed as illustrated in FIG. 9 and each of such springs is designated by the reference numeral 111A. Each spring 111A is fastened in position by an associated fastening screw 112A at each end thereof whereby with the mandrel 20A in its collapsed condition each spring 111A is at its minimum axial length 113A, as shown in FIG. 9. However, upon axially moving the segments 36A relative to the central support shaft 21A each spring 111A is expanded to a greater axial length 114A. It will be appreciated that the springs 111A are expanded or stretched different lengths each corresponding to a desired effective diameter of the mandrel 20A intermediate the minimum and maximum effective diameters shown in FIG. 9. It will also be appreciated that other means may be employed to hold the segments 36A in position such as a single toroidal spring, or other types of yielding resilient members.

In a similar manner as described previously in connection with the mandrel 20, the mandrel 20A is built up and then machined at a position intermediate the minimum effective diameter and the maximum effective diameter so that it has perfect right circular cylindrical configuration at such intermediate position.

The mandrel 20 of this invention has been described in connection with the use thereof in grinding and cutting of tubular sleeves each employed to make a plurality of endless power transmission belts. However, the mandrel of this invention may be employed for other uses as required not only in the belt making art, but also in the gasket making art and other similar arts. Further, the mandrel of this invention may be employed in connection with curing pots or similar apparatus employed in the belt making art where it is necessary to provide an expandable and collapsible mandrel.

In utilizing the mandrel of this invention it may be desired to dispose a so-called build-up sleeve around its outside supporting surface (whether surface 44 of mandrel 20 or surface 44A of the mandrel 20A) for the dual purpose of protecting the associated segments and providing greater versatility for each mandrel by enabling each mandrel to be used at an even larger number of effective diameters.

The various component parts of each mandrel 20 and 20 A may be made employing suitable materials as known in the art. Preferably such materials are metallic materials such as aluminous and ferrous materials. However, non-metallic materials may also be used such as synthetic plastic materials.

While present exemplary embodiments of this invention, and methods of practicing the same, have been illustrated and described, it will be recognized that this invention may be otherwise variously embodied and practiced within the scope of the following claims.

What is claimed is:

1. In a method of making an expandable and collapsible mandrel comprising the steps of providing a central support and supporting a plurality of longitudinal segments for movement toward and away from said support, the improvement comprising the steps of forming circumferentially disposed intermeshing fingers on said segments so that said fingers cooperate to provide a substantially cylindrical supporting outside surface at each of an infinite number of effective diameters and so that said supporting surface at each effective diameter is free of longitudinal gaps which extend the full length of said longitudinal segments, and machining said segments and their associated fingers at a position intermediate a minimum effective diameter and a maximum effective diameter thereof to define a perfect right circular cylindrical surface at such intermediate position and a substantially right circular cylindrical surface at all other effective diameters.

2. A method as set forth in claim 1 in which said step of supporting a plurality of longitudinal segments for movement toward and away from said support comprises pivotally supporting said segments.

3. A method as set forth in claim 2 in which said step of supporting a plurality of longitudinal segments for movement toward and away from said support comprises supporting said segments with a plurality of rectilinear links and associated pins by pivotally connecting said segments to said central support employing said links and pins.

4. A method as set forth in claim 2 in which said step of supporting a plurality of longitudinal segments for movement toward and away from said support comprises supporting said segments employing cam surfaces on said central support and cooperating inclined supporting surfaces on said segments.

5. A method as set forth in claim 4 in which said cam surfaces and cooperating inclined supporting surfaces are cooperating planar surfaces.

6. A method as set forth in claim 1 in which said step of machining said segments comprises the step of grinding said segments.

7. A method as set forth in claim 1 in which said step of machining said segments comprises the step of cutting said segments.

* * * * *